United States Patent
Wang et al.

(10) Patent No.: US 12,244,579 B2
(45) Date of Patent: Mar. 4, 2025

(54) DOMAIN NAME ENCRYPTION METHOD, DECRYPTION METHOD, AND APPARATUS BASED ON CONTENT DELIVERY NETWORK

(71) Applicant: Beijing Volcano Engine Technology Co., Ltd., Beijing (CN)

(72) Inventors: Qing Wang, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/805,871

(22) Filed: Aug. 15, 2024

(65) Prior Publication Data
US 2024/0406152 A1 Dec. 5, 2024

(30) Foreign Application Priority Data
Sep. 27, 2023 (CN) .......................... 202311268420.3

(51) Int. Cl.
*H04L 29/06* (2006.01)
*H04L 9/40* (2022.01)

(52) U.S. Cl.
CPC .......... *H04L 63/0435* (2013.01); *H04L 63/20* (2013.01)

(58) Field of Classification Search
CPC . H04L 63/20; H04L 63/0435; H04L 63/1483; H04L 63/101; H04L 63/0263; H04L 63/1466

(Continued)

(56) References Cited

U.S. PATENT DOCUMENTS

| 11,775,977 B1 * | 10/2023 | Kruse | G06Q 20/4014 |
| | | | 705/40 |
| 2012/0259998 A1 * | 10/2012 | Kaufman | H04L 61/251 |
| | | | 709/245 |

(Continued)

FOREIGN PATENT DOCUMENTS

| CN | 113055344 A | 6/2021 |
| CN | 117278211 A | 12/2023 |

OTHER PUBLICATIONS

ISA China National Intellectual Property Administration, International Search Report and Written Opinion for International Application No. PCT/CN2024/111787, mailed Nov. 14, 2024, 16 pages.

(Continued)

*Primary Examiner* — Longbit Chai
(74) *Attorney, Agent, or Firm* — Alleman Hall & Tuttle LLP

(57) ABSTRACT

The present disclosure relates to a domain name encryption method, decryption method, and apparatus based on a content delivery network. The method comprises: receiving an access request for an initial server sent by a terminal; acquiring, in a case that the initial server needs to be redirected to a target server, a synthetic record domain name of the target server, the synthetic record domain name carrying a domain name resolution result of the target server; and encrypting the synthetic record domain name to obtain an encrypted synthetic record domain name, and sending the encrypted synthetic record domain name to the terminal. By encrypting the synthetic record domain name, an illegal user can be prevented from knowing data information about the domain name resolution result in the synthetic record domain name, which can improve the security of the data, and can significantly improve the processing efficiency of the domain name.

20 Claims, 4 Drawing Sheets

(58) Field of Classification Search
USPC .......................................................... 713/168
See application file for complete search history.

(56) References Cited

U.S. PATENT DOCUMENTS

| 2020/0067977 A1* | 2/2020 | Lee ..................... H04L 63/1491 |
| 2020/0074092 A1 | 3/2020 | Fliam et al. |
| 2023/0188498 A1 | 6/2023 | Sonwane et al. |

OTHER PUBLICATIONS

Liu, W.F., et al., "Survey on Domain Name System Measurement Research," Journal of Software, Jan. 2022, vol. 33 (1), pp. 211-232. 22 pages.

* cited by examiner

DOMAIN NAME ENCRYPTION METHOD, DECRYPTION METHOD, AND APPARATUS BASED ON CONTENT DELIVERY NETWORK

CROSS-REFERENCE TO RELATED APPLICATION(S)

This application claims priority to Chinese Application No. 202311268420.3 filed Sep. 27, 2023, the disclosure of which is incorporated herein by reference in its entity.

FIELD

The present disclosure relates to the field of computer technology, and in particular to a domain name encryption method, decryption method and apparatus based on a content distribution network.

BACKGROUND

Domain name resolution is a technology that points a domain name to the Internet Protocol (IP) address of a website space, allowing people to conveniently access the website through the registered domain name. Domain names are usually used instead of IP addresses to identify site addresses. Domain name resolution is a process of converting a domain name to an IP address, and the domain name system (DNS) server completes a domain name resolution work.

In a content delivery network (CDN) system, synthetic record domain names are usually supported, that is, when a user requests DNS resolution, a resolution result is hidden within the requested domain name, and the DNS then extracts the resolution result from the synthetic record domain name.

However, once the synthetic record domain name mentioned above is intercepted by an illegal user, the illegal user can forge a legitimate domain name resolution and certificate based on the characteristics of the synthetic record domain name. To address this problem, related technologies usually adopt a whitelist mechanism, so that only the whitelist of a specific network segment can be legally resolved. However, since the network segments of the CDN edge nodes in practice are relatively discrete, the CDN system needs to configure too many whitelist segments, resulting in a problem of low efficiency by this method.

SUMMARY

The present disclosure provides a domain name encryption method, decryption method, and apparatus based on a content delivery network (CDN).

According to a first aspect of the present disclosure, a domain name encryption method based on a content distribution network (CDN) is provided, which is applied to a CDN system, and the method comprises: receiving an access request for an initial server sent by a terminal; acquiring, in a case that the initial server needs to be redirected to a target server, a synthetic record domain name of the target server, the synthetic record domain name carrying a domain name resolution result of the target server; and encrypting the synthetic record domain name to obtain an encrypted synthetic record domain name, and sending the encrypted synthetic record domain name to the terminal.

According to a second aspect of the present disclosure, a domain name decryption method based on a content distribution network is provided, which is applied to a domain name system (DNS), and the method comprises: receiving a domain name resolution request sent by a terminal, the domain name resolution request comprising an encrypted synthetic record domain name; decrypting the encrypted synthetic record domain name to obtain a domain name resolution result; and sending the domain name resolution result to the terminal.

According to a third aspect of the present disclosure, a domain name decryption method based on a content distribution network is provided, which is applied to a terminal, and the method comprises: sending an access request for an initial server to a CDN system; receiving an encrypted synthetic record domain name sent by the CDN system, wherein the encrypted synthetic record domain name is obtained by encrypting a domain name resolution result of a target server; sending a domain name resolution request comprising the encrypted synthetic record domain name to a DNS system; receiving the domain name resolution result sent by the DNS system; and sending, based on the domain name resolution result, an access request for the target server to the DNS system.

According to a fourth aspect of the present disclosure, a domain name encryption apparatus based on a content distribution network is provided, which is applied to a CDN system, and the apparatus comprises: an access request receiving module, configured to receive an access request for an initial server sent by a terminal; a synthetic record domain name acquisition module, configured to acquire, in a case that the initial server needs to be redirected to a target server, a synthetic record domain name of the target server, the synthetic record domain name carrying a domain name resolution result of the target server; and an encryption module, configured to encrypt the synthetic record domain name to obtain an encrypted synthetic record domain name, and send the encrypted synthetic record domain name to the terminal.

According to a fifth aspect of the present disclosure, a domain name decryption apparatus based on a content distribution network is provided, which is applied to a DNS system, and the apparatus comprises: a domain name resolution request receiving module, configured to receive a domain name resolution request sent by a terminal, the domain name resolution request comprising an encrypted synthetic record domain name; a decryption module, configured to decrypt the encrypted synthetic record domain name to obtain a domain name resolution result; and a domain name resolution result sending module, configured to send the domain name resolution result to the terminal.

According to a sixth aspect of the present disclosure, a domain name decryption apparatus based on a content distribution network is provided, which is applied to a terminal, and the apparatus comprises: an access request sending module, configured to send an access request for an initial server to a CDN system; an encrypted synthetic record domain name receiving module, configured to receive an encrypted synthetic record domain name sent by the CDN system, wherein the encrypted synthetic record domain name is obtained by encrypting a domain name resolution result of a target server; a domain name resolution request sending module, configured to send a domain name resolution request comprising the encrypted synthetic record domain name to a DNS system; a domain name resolution result receiving module, configured to receive the domain name resolution result sent by the DNS system; and an access request sending module, configured to send an access request for the target server to the DNS system based on the domain name resolution result.

According to a seventh aspect of the present disclosure, an electronic device is provided. The electronic device comprises: a memory and a processor. A computer program is stored in the memory, and when the processor executes the program, the method described above is implemented.

According to an eighth aspect of the present disclosure, a computer-readable storage medium is provided, on which a computer program is stored, and when the program is executed by a processor, the method mentioned above of the present disclosure is implemented.

BRIEF DESCRIPTION OF THE DRAWINGS

In the following description of exemplary embodiments in combination with the accompanying drawings, more details, features and advantages of the present disclosure are disclosed, wherein.

DETAILED DESCRIPTION OF EMBODIMENTS

Figure 1:
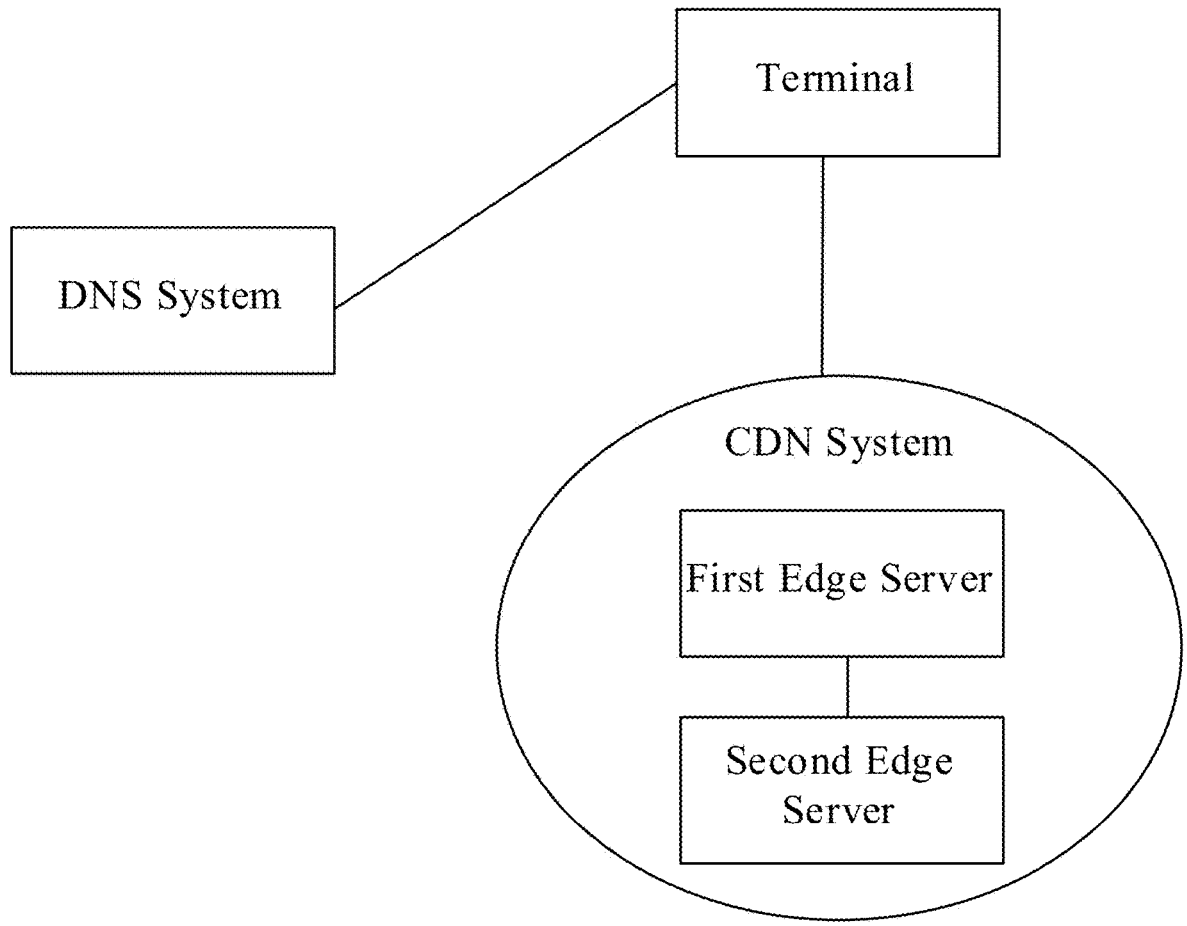
FIG. 1 is a schematic diagram of a scenario provided by an exemplary embodiment of the present disclosure.

Embodiments of the present disclosure will be described in more detail below with reference to the accompanying drawings. Although certain embodiments of the present disclosure are shown in the accompanying drawings, it should be understood that the present disclosure can be implemented in various forms and should not be construed as being limited to the embodiments described herein. Instead, these embodiments are provided to provide a more thorough and complete understanding of the present disclosure. It should be understood that the accompanying drawings and embodiments of the present disclosure are only for exemplary purposes and are not intended to limit the protection scope of the present disclosure.

It should be understood that the various steps described in the method implementation of the present disclosure can be performed in different orders and/or in parallel. In addition, the method implementation may include additional steps and/or omit the steps shown. The scope of the present disclosure is not limited in this respect.

As used herein, the term "comprising" and its variations are open-ended terms meaning "including but not limited to". The term "based on" means "at least partially based on".

The term "an embodiment" means "at least one embodiment"; the term "another embodiment" means "at least one additional embodiment"; the term "some embodiments" means "at least some embodiments". Relevant definitions of other terms will be provided in the following description. It should be noted that the concepts of "first", "second", etc., mentioned in this disclosure are used solely to distinguish between different devices, modules, or units, and are not intended to limit the sequence or interdependence of the functions performed by these devices, modules, or units.

It should be noted that the modifiers "a" and "multiple" mentioned in this disclosure are illustrative and not restrictive. Those skilled in the art should understand that, unless explicitly stated otherwise in context, these terms should be understood as "one or more".

The names of the messages or information exchanged between multiple devices in the embodiments of the present disclosure are only for illustrative purposes, and are not used to limit the scope of these messages or information.

It can be understood that before using the technical solutions disclosed in the embodiments of the present disclosure, the types, scope of use, usage scenarios, etc. of personal information involved in the present disclosure should be informed to the user and the user's authorization should be obtained in an appropriate manner in accordance with relevant laws and regulations.

For example, in response to receiving the user's active request, a prompt message is sent to the user to clearly prompt the user that the operation requested to be performed will require the acquisition and use of the user's personal information. Thus, the user can autonomously choose whether or not to provide personal information to software or hardware such as electronic devices, applications, servers or storage media that perform the operations of the technical solutions of the present disclosure according to the prompt information.

As an optional but non-limiting implementation, in response to receiving an active request from the user, the method of sending a prompt message to the user may be, for example, a pop-up window, in which the prompt message may be presented in text. In addition, the pop-up window may also carry a selection control for the user to choose "agree" or "disagree" to provide personal information to the electronic device. It can be understood that the above notification and the process of acquiring user authorization are only illustrative and do not constitute a limitation on the implementation of the present disclosure. Other methods that meet relevant laws and regulations may also be applied to the implementation of the present disclosure.

In an embodiment, as shown in FIG. 1, when a terminal needs to access, for example, a certain edge server, it will send a domain name resolution request to a DNS. After receiving the domain name resolution request, the DNS system will resolve the domain name carried in the domain name request and send the resolution result to the terminal. For example, the resolution result may be the IP address of the first edge server in FIG. 1.

When the terminal obtains the IP address of the first edge server, it will send an access request to the first edge server in the CDN system according to the IP address. In the scheduling system of the CDN, there is a 302 scheduling that can redirect the scheduling of the edge node. This redirection is generally to dynamically access a node based on the optimal scheduling decision. For example, after the terminal accesses this node of the first edge server, the first edge server will redirect the access resource to the second edge server of the 1.1.1.1 node. Exemplarily, the first edge server can rewrite https://1.1.1.1/bytedance.jpg. Since the redirection of the 302 scheduling is based on security considerations, the HTTPS access method is often used. This access method can directly reach the target domain name, but because the certificate is not convenient to issue, there will be a problem of requiring an HTTPS certificate. Because it is generally not very convenient to issue certificates when 1.1.1.1 is used as a domain name.

Since the CDN system can usually support synthetic record domain names, the CDN system will return a synthetic record domain name carrying the domain name resolution result of the second edge server to the terminal, and after receiving the synthetic record domain name, the terminal will send the synthetic record domain name to the DNS server. Once the above-mentioned synthetic record domain name is intercepted by an illegal user, the illegal user may forge a legitimate domain name resolution and certificate according to the characteristics of the synthetic record domain name. In addition, the use of whitelist means will lead to low efficiency. In the embodiments of the present disclosure, the CDN system will encrypt the synthetic record domain name to obtain an encrypted synthetic record domain name, and return the encrypted synthetic record domain name to the terminal. After receiving the encrypted synthetic record domain name, the terminal will send a request comprising the encrypted synthetic record domain name to the DNS. The DNS receives the request, decrypts the encrypted synthetic record domain name, obtains the IP address of the second edge server, and returns the IP address to the terminal, so that the terminal can access the second edge server after receiving the IP address.

In an embodiment, an advanced encryption standard (AES) encryption algorithm or other encryption algorithms may be specifically used, and the AES is used as an example for explanation in the embodiment, but the embodiment is not limited thereto. For example, the CDN system redirects the scheduling of the edge node to the second edge server through 302 scheduling, and the address of the edge server is 1.1.1.1.

For the case of IPV4, a key sequence comprising a plurality of keys is obtained, for example, the first key key1 in the key sequence may be selected for encryption. For the AES encryption algorithm, an IV offset value needs to be selected for each encryption. The offset value includes 16 characters, which uses 0-F to represent hexadecimal characters. For example, the selected IV offset value is: E10ADC3949BA59AB. It should be noted that, in the embodiment, it is best not to use a same IV offset value each time encryption is performed, and different IV offset values can be used, otherwise the security of the encryption system will be reduced. The encrypted characters are described in uppercase, which essentially uses the hexadecimal value during encryption.

The CDN system encrypts 1-1-1-1. If the encrypted data is read directly in ASCII, it usually results in some unreadable encoded characters. Here, we have chosen the base32 encoding scheme. After encoding, it is: KU5WBWRU7NVQ76YYBT4R77OLJE In an embodiment, the characters obtained after base32 encoding are only uppercase letters. If an encoding scheme like base64 is chosen, there will be different characters in uppercase and lowercase after encoding. However, the entire DNS system is case-insensitive, and the DNS system will force uppercase to lowercase when requesting a domain name, which will cause the encrypted information to be distorted and the DNS server to be unable to perform correct decryption.

In an embodiment, the '=' characters at the end of the characters obtained after base32 encoding are removed, and these characters belong to the complement information like padding at the end. After obtaining KUSWBWRUNVQ76YYBT4R77OLJE at the peer end, it can be calculated that 6 '=' need to be added. The calculation method is: 8-len (str) % 8, which is 8-26% 8=8-2-6 for the previous characters.

In this way, the encrypted synthetic record domain name can be obtained: 1E10ADC3949BA59AB.KU5WBW-RU7NVQ76YYBT4R77OLJE.bytedance.com, where the first 1 at the beginning indicates that the first key is used for encryption. It is followed by the IV offset value "E10ADC3949BA59AB", followed by the encrypted information. It should be noted that the DNS system is case-insensitive, and in fact the final requested domain name will be uniformly converted to lowercase.

In this way, the CDN will send the encrypted synthetic record domain name to the terminal, and the terminal will send a domain name resolution request comprising the encrypted synthetic record domain name to the DNS.

The DNS system will acquire 1e10adc3949ba59ab.ku5wbwru7nvq76yybt4r77olje.bytedance.com.

The DNS system finds the corresponding encryption key key1 based on the first character, and acquires 16 characters as the encryption offset IV, and then converts the prefix ku5wbwru7nvq76yybt4r77olje of the second-level domain name of the subsequent bytedance.com to uppercase, and adds padding (=) at the end, and then decrypts the updated string, and obtains the decrypted information, which is 1-1-1-1. Then it responds to 1.1.1.1 according to the standard synthetic record resolution process.

For the case of IPV6, compared with IPV4, the difference between IPV6 and IPV4 is that the character length of IPV6 may exceed 63 characters after encryption, but DNS resolution requires that a level is allowed to have a maximum of 63 characters. Therefore, in the embodiment, the encrypted characters are segmented using '.'. For example: In IPV6, when encrypting AD80-0000-0000-0000-ABAA-0000-00C2-0002 (of course, it can also be abbreviated as AD80--ABAA-0-C2-2), the encrypted character length may exceed 63 bits: R7ZEDSPI63PLWBNRYHKBKU717V2KU-N3DBYJJLHGPHBFIXXAD7HLEPLESFEOIT2R MLNHBWYJD7WVFM===; as the DNS protocol requires that each level of domain name cannot exceed 63 characters, the embodiment uses "." to segment, and obtains: 1E10ADC3949BA59AB.R7ZEDSPI63PLWBNRYHKB-KU717V2KUN3DBYJJLHGPHBFIXX AD7HLEPLESF-EOI.T2RMLNHBWYJD7WVFM.huoshanlive.com; the subsequent segmentation is consistent with the processing method of IPV4, which will not be repeated here.

When the DNS system obtains the encrypted synthetic record domain name, it will process the characters following the IV offset value, by removing the '.', converting it to uppercase, and adding '=' at the end. The rest of the processing is the same as the above IPV4, which will not be repeated here.

It should be noted that in order to make the encrypted synthetic record domain name more intuitive and increase readability, that is, the resource identifier of the domain name can be read from the encrypted synthetic record domain name, the embodiments of the present disclosure can also support matching of the encrypted domain name similar to the wildcard domain name prefix. For example, the domain name resource identifier in the above IPV4 is douyin, and the domain name can be set to douyin-1e10adc3949ba59ab.ku5wbwru7nvq76yybt4r77olje.bytedance.com in the embodiment. In the DNS system, the prefix *- can be configured for the zone of the synthetic record bytedance. com, indicating that a wildcard prefix can be implemented. When the DNS system specifically implements the synthetic record, if the configuration of *- is read, all characters before the "-" in the domain name request are ignored, and then the logic of decrypting the synthetic record is performed to increase the readability of the encrypted synthetic record domain.

Figure 2:
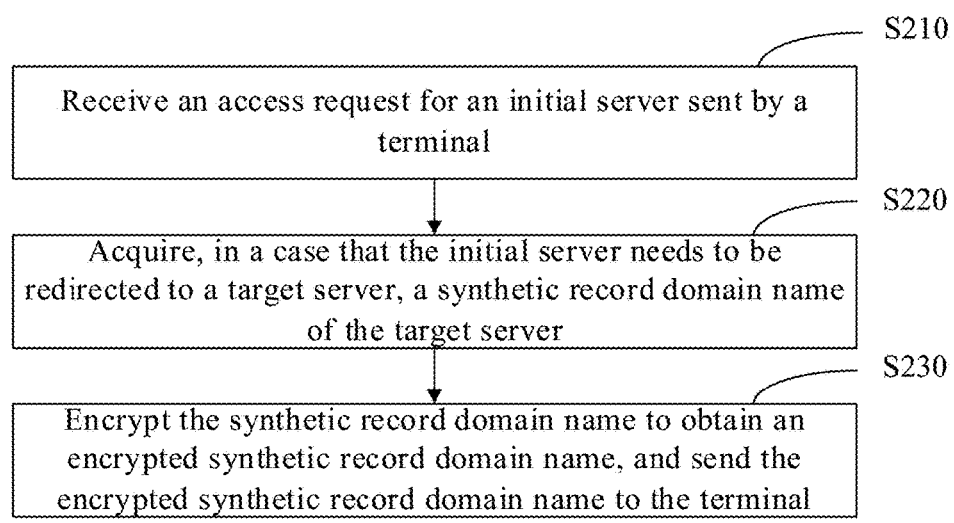
FIG. 2 is a flow chart of a domain name encryption method based on a content distribution network provided by an exemplary embodiment of the present disclosure.

Based on the above embodiment, in another embodiment provided by the present disclosure, a domain name encryption method based on a content distribution network is also provided. The method can be applied to a CDN system. As shown in FIG. 2, the method may comprise the following steps:

Step S210, receiving an access request for an initial server sent by a terminal.

Step S220, acquiring, in a case that the initial server needs to be redirected to a target server, a synthetic record domain name of the target server.

In this embodiment, the synthetic record domain name carries a domain name resolution result of the target server.

Step S230, encrypting the synthetic record domain name to obtain an encrypted synthetic record domain name, and sending the encrypted synthetic record domain name to the terminal.

In an embodiment, the terminal obtains the IP address of the initial server by sending a domain name resolution request to the DNS system. Through the IP address, the terminal sends an access request for the initial server to the CDN system. As shown in FIG. 1, the initial server may be the first edge server mentioned above, and the target server may be the second edge server mentioned above.

If the initial server is not the optimal edge node for the terminal, the CDN system will redirect the node to be accessed by the terminal from the initial server to another server, namely the target server, through 302 scheduling. The CDN system will send a synthetic record domain name comprising the domain name resolution result of the target server to the terminal in the form of a synthetic record. However, for security reasons, the CDN system will encrypt the synthetic record domain name, obtain an encrypted synthetic record domain name, and send the encrypted synthetic record domain name to the terminal.

In an embodiment, when the CDN system encrypts the synthetic record domain name, it mainly encrypts the domain name resolution result in the synthetic record domain name, that is, the CDN system encrypts the domain name resolution result in the synthetic record domain name, and obtains an encrypted synthetic record domain name comprising the encrypted domain name resolution result. This eliminates the need to encrypt all data in the synthetic record domain name, which can improve encryption efficiency.

Based on the above embodiment, in order to encrypt the domain name resolution result in the synthetic record domain name, a corresponding algorithm can be selected for encryption, so the method can also comprise the following steps:

Step S231, acquiring a target key and a target offset value.

Step S232, encrypting the domain name resolution result based on the target key and the target offset value to obtain the encrypted synthetic record domain name.

In an embodiment, referring to the description of the above embodiment, the AES algorithm can be selected for encryption. Of course, other encryption methods can also be used for encryption, including other symmetric encryption algorithms or asymmetric encryption algorithms, etc. The embodiment only takes the AES algorithm as an example for illustration, and the embodiment is not limited thereto.

When the AES algorithm is used for encryption, in the IPV4 scenario, multiple groups of keys can be obtained, and one key can be selected from the multiple groups of keys as the target key for encryption, and an IV offset value is obtained as the target offset value, and the target offset value can include 16 characters, for example: E10ADC3949BA59AB. In this way, the domain name resolution result can be encrypted by the target key and the target offset value to obtain an encrypted synthetic record domain name.

The encrypted synthetic record domain name can be obtained by the above encryption method. If the encrypted synthetic record domain name is read directly according to ASCII, it cannot be read directly and needs to be encoded. Therefore, based on the above embodiment, in another embodiment provided by the present disclosure, the method may further comprise the following steps:

Step S240, encoding the encrypted domain name resolution result in a target encoding scheme to obtain encoded data.

Step S250, performing target processing on the encoded data to obtain processed target encoded data.

Therein, the target processing is used for removing target characters from the encoded data.

Step S260, obtaining the encrypted synthetic record domain name based on an identifier of the target key, the target offset value, and the encrypted domain name resolution result.

In an embodiment, base32 can be used to encode the domain name resolution result. For example, the encoded data is obtained: KU5WBWRU7NVQ76YYBT-4R77OLJE=====; by removing the "=" using a target processing approach, KU5WBWRU7NVQ76YYBT4-R77OLJE can be obtained, and then the encrypted synthetic record domain name can be obtained. For details, please refer to the corresponding description of the above embodiment, which will not be repeated here.

It should be noted that in the embodiment, in the scenario where the domain name resolution result belongs to IPv6, the encrypted string in the encrypted domain name resolution result can be segmented in characters, to obtain the encrypted domain name resolution result.

The character length of IPV6 may exceed 63 characters after encryption, but DNS resolution requires that a level can only have 63 characters at most. Therefore, in the embodiment, '.' is used to segment the encrypted characters.

In an embodiment, the domain name identifier corresponding to the domain name resolution result can also be obtained, and the domain name identifier can be added to the encrypted synthetic record domain name as a prefix of the encrypted synthetic record domain name.

For example, the resource identifier of the domain name can be read from the encrypted synthetic record domain name to support matching of the encrypted domain name similar to the wildcard domain name prefix. For example, adding the domain name resource identifier douyin as a prefix to the encrypted synthetic record domain name can make the encrypted synthetic record domain name more readable.

Based on the above embodiments, in another embodiment provided by the present disclosure, a domain name decryption method based on a content distribution network is also provided, which can be applied to a DNS system, and the method may comprise the following steps:

Step S310, receiving a domain name resolution request sent by a terminal, wherein the domain name resolution request contains an encrypted synthetic record domain name.

Step S320, decrypting the encrypted synthetic record domain name to obtain a domain name resolution result.

Step S330, sending the domain name resolution result to the terminal.

In an embodiment, after receiving the domain name resolution request sent by the terminal, the DNS system acquires the encrypted synthetic record domain name included in the domain name resolution request, decrypts the encrypted synthetic record domain name, obtains the domain name resolution result, and sends the domain name resolution result to the terminal.

In the process of the DNS system decrypting the encrypted synthetic record domain name, the encryption algorithm in the encrypted synthetic record domain name can be decrypted. For example, when the encryption algorithm is a symmetric encryption algorithm, the encryption key during encryption can be acquired for decryption, and when an asymmetric encryption algorithm is used, the corresponding decryption key can be acquired for decryption.

Specifically, the target key corresponding to the encrypted synthetic record domain name can be acquired, and the target offset value in the encrypted synthetic record domain name can be obtained. The encrypted synthetic record domain name is decrypted based on the target key and the target offset value to obtain the domain name resolution result. For example, in the embodiment, the encrypted domain name resolution result in the encrypted synthetic record domain name can be acquired, and the encrypted domain name resolution result is subjected to target processing to obtain the processed encrypted domain name resolution result. Therein, the target processing includes adding the target characters in the encrypted domain name resolution result. And the processed encrypted domain name resolution result is decrypted based on the target key and the target offset value to obtain the domain name resolution result.

In an embodiment, when the DNS system decrypts the encrypted synthetic record domain name, it can select the corresponding key according to the encrypted synthetic record domain name. For example, as for the encrypted synthetic record domain name encrypted by the AES algorithm, the first character is the corresponding key identifier. If the key identifier is 1, it indicates that the corresponding key is key1, and based on the 16-bit characters following the key representation as the target offset value, the encrypted resolution result following the target offset value in the encrypted synthetic record domain name is converted to uppercase characters, and a corresponding number of "=" are added at the end, and the processed encrypted resolution domain name is decrypted to obtain the IP address of the target server, and the IP address is sent as the domain name resolution result to the terminal.

Based on the above embodiments, in another embodiment provided by the present disclosure, a domain name decryption method based on a content distribution network is also provided, which can be applied to a terminal, and the method may comprise the following steps:

Step S410, sending an access request for an initial server to a CDN system.

Step S420, receiving an encrypted synthetic record domain name sent by the CDN system, wherein the encrypted synthetic record domain name is obtained by encrypting a domain name resolution result of a target server.

Step S430, sending a domain name resolution request comprising the encrypted synthetic record domain name to a DNS system.

Step S440, receiving the domain name resolution result sent by the DNS system.

Step S450, sending, based on the domain name resolution result, an access request for the target server to the DNS system.

In an embodiment provided by the present disclosure, in combination with FIG. 1, when a terminal needs to access a certain edge server in a CDN system, for example, the edge server can be referred to as an initial server. The terminal will send a domain name resolution request for the initial server to the DNS, and after obtaining the domain name resolution result for the initial server sent by the DNS system, the terminal will send an access request for the initial server to the CDN.

If the initial server is not the optimal server for the terminal, that is, other servers will provide better server resources for the terminal, the CDN will schedule the access request of the terminal from the initial server to the target server. At the same time, for security reasons, the CDN will send the encrypted synthetic record domain name to the terminal in the form of a synthetic record, and the encrypted synthetic record domain name contains the encrypted domain name resolution result of the target server.

After receiving the encrypted synthetic record domain name, the terminal will send a request comprising the encrypted synthetic record domain name to the DNS system to obtain the domain name resolution result of the target server returned by the DNS system through decryption, so that the terminal can send an access request for the target server to the DNS system based on the domain name resolution result.

Figure 3:
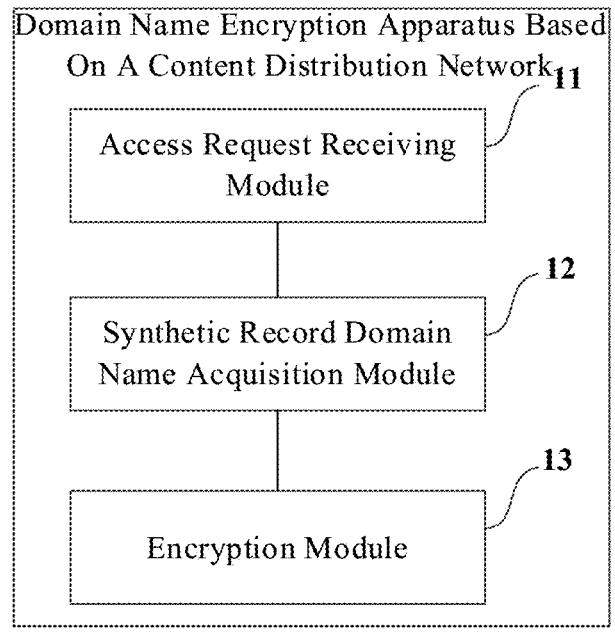
FIG. 3 is a schematic block diagram of functional modules of a domain name encryption apparatus based on a content distribution network provided by an exemplary embodiment of the present disclosure.

In the case of dividing various functional modules corresponding to each function, an embodiment of the present disclosure provides a domain name encryption apparatus based on a content delivery network, which can be a server or a chip applied to a server. FIG. 3 is a schematic block diagram of functional modules of a domain name encryption apparatus based on a content distribution network provided by an exemplary embodiment of the present disclosure. As shown in FIG. 3, the domain name encryption apparatus based on the content distribution network can be applied to a CDN, and the apparatus may comprise: an access request receiving module 11, configured to receive an access request for an initial server sent by a terminal; a synthetic record domain name acquisition module 12, configured to acquire, in a case that the initial server needs to be redirected to a target server, a synthetic record domain name of the target server, the synthetic record domain name carrying a domain name resolution result of the target server; and an encryption module 13, configured to encrypt the synthetic record domain name to obtain an encrypted synthetic record domain name, and send the encrypted synthetic record domain name to the terminal.

In another embodiment provided by the present disclosure, the encryption module is further specifically configured to: encrypt the domain name resolution result in the synthetic record domain name, and obtain an encrypted synthetic record domain name comprising the encrypted domain name resolution result.

In another embodiment provided by the present disclosure, the encryption module is further specifically configured to: acquire a target key and a target offset value; and encrypt the domain name resolution result based on the target key and the target offset value to obtain the encrypted synthetic record domain name.

In another embodiment provided by the present disclosure, the apparatus further comprises: an encoding module for encoding the encrypted domain name resolution result in a target encoding scheme to obtain encoded data; a target processing module for performing target processing on the encoded data to obtain processed target encoded data, wherein the target processing is used for removing target characters from the encoded data; and an encrypted synthetic record domain name acquisition module for obtaining the encrypted synthetic record domain name based on an identifier of the target key, the target offset value, and the encrypted domain name resolution result.

In another embodiment provided by the present disclosure, the apparatus further comprises: a segmentation module for performing, in a case that the domain name resolution result belongs to IPv6, character segmentation on an encrypted character string in the encrypted domain name resolution result to obtain the encrypted domain name resolution result.

In another embodiment provided by the present disclosure, the apparatus further comprises: an identification acquisition module, configured to acquire a domain name identifier corresponding to the domain name resolution result; and an identification adding module, configured to add the domain name identifier to the encrypted synthetic record domain name as a prefix of the encrypted synthetic record domain name.

Figure 4:
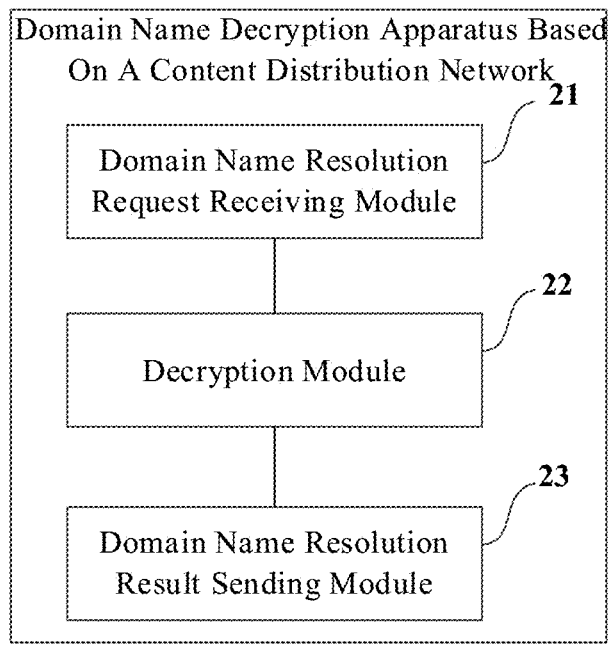
FIG. 4 is a schematic block diagram of functional modules of a domain name decryption apparatus based on a content distribution network provided by an exemplary embodiment of the present disclosure.

In the case of dividing various functional modules corresponding to each function, an embodiment of the present disclosure provides a domain name decryption apparatus based on a content distribution network, and the domain name decryption apparatus based on the content distribution network can be a server or a chip applied to a server. The apparatus can be applied to a DNS system, and FIG. 4 is a schematic block diagram of functional modules of a domain name decryption apparatus based on a content distribution network provided by an exemplary embodiment of the present disclosure. As shown in FIG. 4, the apparatus may comprise: a domain name resolution request receiving module 21, configured to receive a domain name resolution request sent by a terminal, the domain name resolution request comprising an encrypted synthetic record domain name; a decryption module 22, configured to decrypt the encrypted synthetic record domain name to obtain a domain name resolution result; and a domain name resolution result sending module 23, configured to send the domain name resolution result to the terminal.

In another embodiment provided by the present disclosure, the decryption module is specifically configured to: acquire a target key corresponding to the encrypted synthetic record domain name, and acquire a target offset value in the encrypted synthetic record domain name; and decrypt the encrypted synthetic record domain name based on the target key and the target offset value to obtain a domain name resolution result.

In another embodiment provided by the present disclosure, the decryption module is further specifically configured to: acquire an encrypted domain name resolution result in the encrypted synthetic record domain name; perform target processing on the encrypted domain name resolution result to obtain a processed encrypted domain name resolution result, wherein the target processing comprises adding a target character in the encrypted domain name resolution result; and decrypt the processed encrypted domain name resolution result based on the target key and the target offset value to obtain the domain name resolution result.

Figure 5:
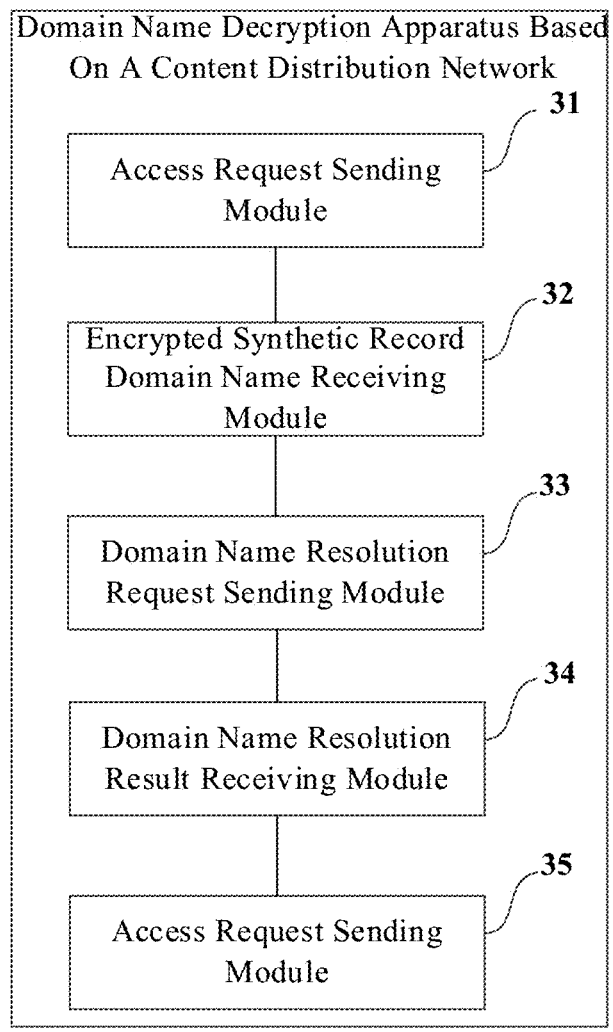
FIG. 5 is a schematic block diagram of functional modules of a domain name decryption apparatus based on a content distribution network provided by another exemplary embodiment of the present disclosure.

In the case of dividing various functional modules corresponding to each function, an embodiment of the present disclosure provides a domain name decryption apparatus based on a content distribution network, and the domain name decryption apparatus can be a server or a chip applied to a server. The apparatus can be applied to a terminal, and FIG. 5 is a schematic block diagram of functional modules of a domain name decryption apparatus based on a content distribution network provided by another exemplary embodiment of the present disclosure. As shown in FIG. 5, the apparatus may comprise: an access request sending module 31, configured to send an access request for an initial server to a CDN system; an encrypted synthetic record domain name receiving module 32, configured to receive an encrypted synthetic record domain name sent by the CDN system, wherein the encrypted synthetic record domain name is obtained by encrypting a domain name resolution result of a target server; a domain name resolution request sending module 33, configured to send a domain name resolution request comprising the encrypted synthetic record domain name to a DNS system; a domain name resolution result receiving module 34, configured to receive the domain name resolution result sent by the DNS system; and an access request sending module 35, configured to send an access request for the target server to the DNS system based on the domain name resolution result.

The relevant parts of the apparatus correspond to the above method embodiments, and the details can be found in the description of the above embodiments, which will not be repeated here.

An embodiment of the present disclosure further provides an electronic device, comprising: at least one processor; and a memory for storing instructions executable by the at least one processor, wherein the at least one processor is configured to execute the instructions to implement the above methods disclosed in the embodiments of the present disclosure.

Figure 6:
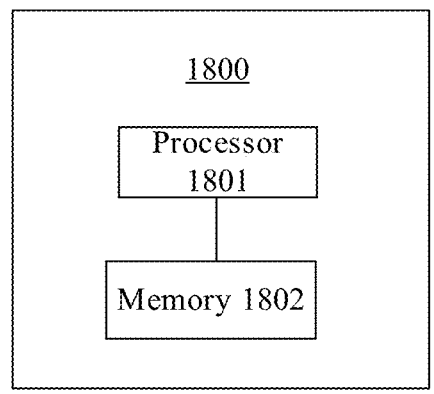
FIG. 6 is a structural block diagram of an electronic device provided by an exemplary embodiment of the present disclosure.

FIG. 6 is a schematic diagram of the structure of an electronic device provided by an exemplary embodiment of the present disclosure. As shown in FIG. 6, the electronic device 1800 comprises at least one processor 1801 and a memory 1802 coupled to the processor 1801, and the processor 1801 can execute the corresponding steps in the above methods disclosed in the embodiments of the present disclosure.

The above processor 1801 can also be called a central processing unit (CPU), which can be an integrated circuit chip with signal processing capabilities. Each step in the above methods disclosed in the embodiments of the present disclosure can be completed by the hardware integrated logic circuit in the processor 1801 or the instruction in the form of software. The above processor 1801 can be a general processor, a digital signal processor (DSP), an ASIC, a field-programmable gate array (FPGA) or other programmable logic devices, discrete gates or transistor logic devices, discrete hardware components. The general processor can be a microprocessor or the processor can also be any conventional processor, etc. The steps of the method disclosed in the embodiment of the present disclosure can be directly embodied as being executed by a hardware decoding processor, or can be executed by a combination of hardware and software modules in the decoding processor.

The software module may be located in the memory 1802, such as a random access memory, a flash memory, a read-only memory, a programmable read-only memory or an electrically erasable programmable memory, a register, or other mature storage media in the art. The processor 1801 reads the information in the memory 1802 and completes the steps of the above method in combination with its hardware.

Figure 7:
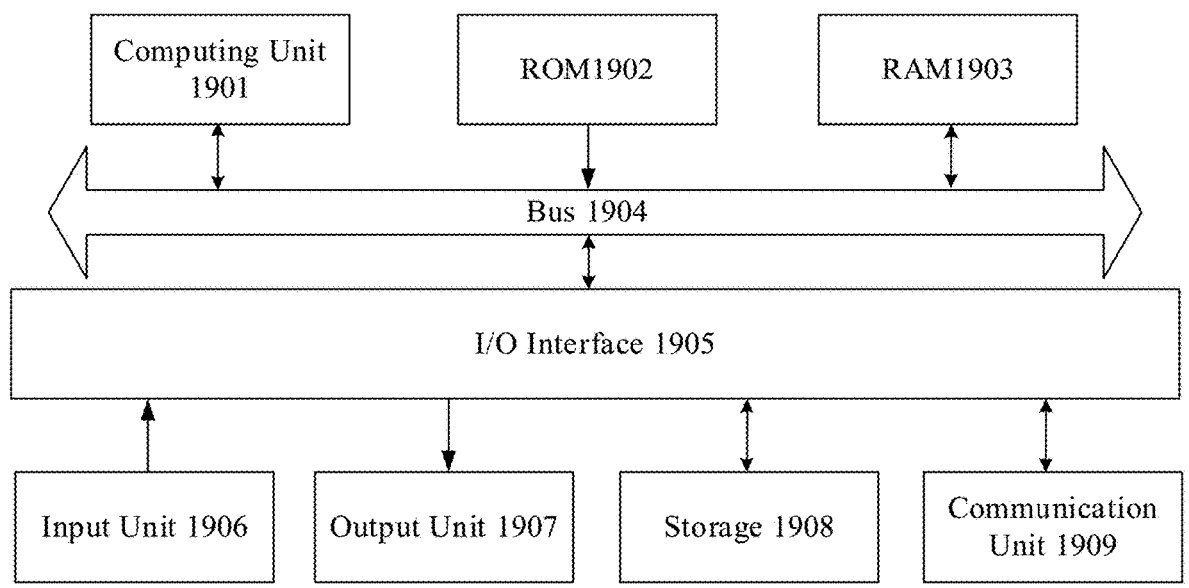
FIG. 7 is a structural block diagram of a computer system provided by an exemplary embodiment of the present disclosure.

In addition, in a case that the various operations/processing according to the present disclosure are implemented by software and/or firmware, the program constituting the software can be installed from the storage medium or network to a computer system with a dedicated hardware structure, such as the computer system 1900 shown in FIG. 7. When various programs are installed, the computer system can perform various functions, including functions such as those described above. FIG. 7 is a structural block diagram of a computer system provided by an exemplary embodiment of the present disclosure.

The computer system 1900 is intended to represent various forms of digital electronic computer devices, such as laptop computers, desktop computers, workstations, personal digital assistants, servers, blade servers, mainframe computers, and other suitable computers. Electronic devices can also represent various forms of mobile devices, such as personal digital assistants, cellular phones, smart phones, wearable devices, and other similar computing devices. The components shown herein, their connections and relationships, and their functions are merely examples and are not intended to limit the implementation of the present disclosure described and/or claimed herein.

As shown in FIG. 7, the computer system 1900 includes a computing unit 1901 that can perform various appropriate actions and processes according to a computer program stored in a read-only memory (ROM) 1902 or a computer program loaded from a storage 1908 into a random access memory (RAM) 1903. In RAM 1903, various programs and data required for the operation of the computer system 1900 can also be stored. The computing unit 1901, ROM 1902, and RAM 1903 are connected to each other via a bus 1904. An input/output (I/O) interface 1905 is also connected to the bus 1904.

Multiple components in the computer system 1900 are connected to the I/O interface 1905, including: an input unit 1906, an output unit 1907, a storage 1908, and a communication unit 1909. The input unit 1906 may be any type of device capable of inputting information into the computer system 1900, and the input unit 1906 may receive input digital or character information, and generate key signal inputs related to user settings and/or function control of the electronic device. The output unit 1907 may be any type of device capable of presenting information, and may include but is not limited to a display, a speaker, a video/audio output terminal, a vibrator, and/or a printer. The storage unit 1908 may include but is not limited to a disk, an optical disk. The communication unit 1909 allows the computer system 1900 to exchange information/data with other devices over a network such as the Internet, and may include but is not limited to a modem, a network card, an infrared communication device, a wireless communication transceiver, and/or a chipset, such as a Bluetooth™ device, a WiFi device, a WiMax device, a cellular communication device, and/or the like.

The computing unit 1901 may be a variety of general and/or dedicated processing components having processing and computing capabilities. Some examples of computing unit 1901 include, but are not limited to, a central processing unit (CPU), a graphics processing unit (GPU), various dedicated artificial intelligence (AI) computing chips, various computing units running machine learning model algorithms, digital signal processors (DSPs), and any appropriate processors, controllers, microcontrollers, etc. The computing unit 1901 performs the various methods and processes described above. For example, in some embodiments, the above methods disclosed in the embodiments of the present disclosure may be implemented as a computer software program, which is tangibly contained in a machine-readable medium, such as a storage unit 1908. In some embodiments, part or all of the computer program may be loaded and/or installed onto the electronic device 1900 via the ROM 1902 and/or the communication unit 1909. In some embodiments, the computing unit 1901 may be configured to execute the above methods disclosed in the embodiments of the present disclosure in any other appropriate manner (for example, by means of firmware).

An embodiment of the present disclosure further provides a computer-readable storage medium, wherein when the instructions in the computer-readable storage medium are executed by a processor of an electronic device, the electronic device is caused to execute the above methods disclosed in the embodiments of the present disclosure.

The computer-readable storage medium in the embodiment of the present disclosure may be a tangible medium that may contain or store a program for use by or in conjunction with an instruction execution system, device or equipment. The above-mentioned computer-readable storage medium may include, but is not limited to, electronic, magnetic, optical, electromagnetic, infrared, or semiconductor systems, devices or equipment, or any suitable combination of the above-mentioned contents. More specifically, the above-mentioned computer-readable storage medium may include an electrical connection based on one or more lines, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above-mentioned contents.

The above-mentioned computer-readable medium may be included in the above-mentioned electronic device; or it may exist separately without being assembled into the electronic device.

An embodiment of the present disclosure further provides a computer program product, including a computer program, wherein the computer program implements the above-mentioned methods disclosed in the embodiments of the present disclosure when executed by a processor.

The embodiments of the present disclosure provide a solution in which, by receiving an access request for an initial server sent by a terminal, in the case that the initial server needs to be redirected to a target server, a synthetic record domain name of the target server is acquired. By encrypting the synthetic record domain name, an encrypted synthetic record domain name is obtained and sent to the terminal. In the embodiments, by encrypting the synthetic record domain name, an illegal user can be prevented from knowing data format of the domain name resolution result in the synthetic record domain name, which can improve the security of the data, and can significantly improve the processing efficiency of the domain name compared to using technical means such as a whitelist.

In the embodiments of the present disclosure, computer program codes for performing the operations of the present disclosure may be written in one or more programming languages or a combination thereof, including but not limited to object-oriented programming languages such as Java, Smalltalk, C++, and conventional procedural programming languages such as "C" or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer via any type of network, including a local area network (LAN) or a wide area network (WAN), or may be connected to an external computer.

The flowcharts and block diagrams in the accompanying drawings illustrate the possible architectures, functions, and operations of the systems, methods, and computer program products according to various embodiments of the present disclosure. In this regard, each block in the flowchart or block diagram may represent a module, a program segment, or a portion of a code, which contains one or more executable instructions for implementing a specified logical function. It should also be noted that in some alternative implementations, the functions noted in the blocks may occur in a different order than that noted in the accompanying drawings. For example, two blocks shown in succession may actually be executed substantially in parallel, or they may sometimes be executed in reverse order, depending on the functions involved. It should also be noted that each block in the block diagram and/or flow chart, and combinations of blocks in the block diagram and/or flow chart, may be implemented with a dedicated hardware-based system that performs the specified functions or operations, or may be implemented with a combination of dedicated hardware and computer instructions.

The modules, components or units described in the embodiments of the present disclosure may be implemented by software or hardware. The names of the modules, components or units do not, in some cases, limit the modules, components or units themselves.

The functions described above herein may be at least partially performed by one or more hardware logic components. For example, without limitation, exemplary hardware logic components that can be used include: field programmable gate array (FPGA), application specific integrated circuit (ASIC), application specific standard product (ASSP), system on chip (SOC), complex programmable logic device (CPLD), etc.

The above descriptions are only some embodiments of the present disclosure and an explanation of the technical principles used. Those skilled in the art should understand that the scope of disclosure involved in the present disclosure is not limited to the technical solutions formed by a specific combination of the above technical features, but should also cover other technical solutions formed by any combination of the above technical features or their equivalent features without departing from the above disclosed concept, such as the technical solutions formed by replacing the above features with the technical features disclosed in the present disclosure (but not limited to) with similar functions.

Although some specific embodiments of the present disclosure have been described in detail by way of example, it should be understood by those skilled in the art that the above examples are for illustration only and are not intended to limit the scope of the present disclosure. It should be understood by those skilled in the art that the above embodiments may be modified without departing from the scope and spirit of the present disclosure. The scope of the present disclosure is defined by the appended claims.

We claim:

1. A domain name encryption method based on a content distribution network (CDN), being applied to a CDN system, and comprising:
   receiving, ny the CDN system, an access request for an initial server sent by a terminal to access a destination node;
   acquiring, by the CDN system in response to determining that the initial server needs to be redirected to a target server, a synthetic record domain name of the target server, wherein the synthetic record domain name carrying a domain name resolution result of the target server; and
   encrypting the synthetic record domain name to obtain an encrypted synthetic record domain name by encrypting the domain name resolution of the target server, and sending the encrypted synthetic record domain name to the terminal so as to enable the terminal to send an access request to the destination node via the target server.

2. The method according to claim 1, wherein encrypting the synthetic record domain name comprises:
   encrypting the domain name resolution result in the synthetic record domain name to obtain the encrypted synthetic record domain name comprising the encrypted domain name resolution result.

3. The method according to claim 2, wherein encrypting the domain name resolution result comprises:
   acquiring a target key and a target offset value; and
   encrypting the domain name resolution result based on the target key and the target offset value, to obtain the encrypted synthetic record domain name.

4. The method according to claim 3, further comprising:
   encoding the encrypted domain name resolution result in a target encoding scheme to obtain encoded data;
   performing target processing on the encoded data to obtain processed target encoded data, wherein the target processing is used for removing target characters from the encoded data; and
   obtaining the encrypted synthetic record domain name based on an identifier of the target key, the target offset value, and the encrypted domain name resolution result.

5. The method according to claim 4, wherein the target encoding scheme is base32 encoding scheme.

6. The method according to claim 2, further comprising:
   performing, in a case that the domain name resolution result belongs to IPv6, character segmentation on an encrypted character string in the encrypted domain name resolution result, to obtain the encrypted domain name resolution result.

7. The method according to claim 1, further comprising:
   acquiring a domain name identifier corresponding to the domain name resolution result; and
   adding the domain name identifier to the encrypted synthetic record domain name, as a prefix of the encrypted synthetic record domain name.

8. The method according to claim 1, wherein the initial server needs to be redirected to a target server in a case that the initial server is not the optimal edge node for the terminal.

9. A non-transitory computer-readable storage medium, wherein when instructions in the computer-readable storage medium are executed by a processor of an electronic device, the electronic device is caused to execute the method according to claim 1.

10. A domain name decryption method based on a content distribution network (CDN), being applied to a domain name system (DNS), and comprising:
receiving a domain name resolution request sent by a terminal, the domain name resolution request comprising an encrypted synthetic record domain, which is obtained by encrypting a synthetic record domain name of a target server carrying a domain name resolution result of the target server within the CDN;
decrypting, by the DNS, the encrypted synthetic record domain name to obtain the domain name resolution result of the target server; and
sending the domain name resolution result to the terminal so as to enable the terminal to send an access request to a destination node via the target server within the CDN.

11. The method according to claim 10, wherein decrypting the encrypted synthetic record domain name to obtain the domain name resolution result comprises:
acquiring a target key corresponding to the encrypted synthetic record domain name, and acquiring a target offset value in the encrypted synthetic record domain name; and
decrypting the encrypted synthetic record domain name based on the target key and the target offset value, to obtain the domain name resolution result.

12. The method according to claim 11, wherein decrypting the encrypted synthetic record domain name based on the target key and the target offset value comprises:
acquiring an encrypted domain name resolution result in the encrypted synthetic record domain name;
performing target processing on the encrypted domain name resolution result to obtain a processed encrypted domain name resolution result, wherein the target processing comprises adding a target character in the encrypted domain name resolution result; and
decrypting the processed encrypted domain name resolution result based on the target key and the target offset value, to obtain the domain name resolution result.

13. A domain name decryption apparatus based on a content distribution network (CDN), being applied to a domain name system (DNS), and comprising:
at least one processor; and
a memory for storing instructions executable by the at least one processor;
wherein the instructions, when executed by the at least one processor, cause the apparatus to perform the method according to claim 10.

14. A non-transitory computer-readable storage medium, wherein when instructions in the computer-readable storage medium are executed by a processor of an electronic device, the electronic device is caused to execute the method according to claim 10.

15. A domain name encryption apparatus based on a content distribution network (CDN), being applied to a CDN system, and comprising:
at least one processor; and
a memory for storing instructions executable by the at least one processor;
wherein the instructions, when executed by the at least one processor, cause the apparatus to:
receive, by the CDN system, an access request for an initial server sent by a terminal to access a destination node;
acquire, by the CDN system in response to determining that the initial server needs to be redirected to a target server, a synthetic record domain name of the target server, wherein the synthetic record domain name carrying a domain name resolution result of the target server; and
encrypt the synthetic record domain name to obtain an encrypted synthetic record domain name by encrypting the domain name resolution result of the target server, and send the encrypted synthetic record domain name to the terminal so as to enable the terminal to send an access request to the destination node via the target server.

16. The apparatus according to claim 15, wherein the instructions causing the apparatus to encrypt the synthetic record domain name further cause the apparatus to:
encrypt the domain name resolution result in the synthetic record domain name to obtain the encrypted synthetic record domain name comprising the encrypted domain name resolution result.

17. The apparatus according to claim 16, wherein the instructions causing the apparatus to encrypt the domain name resolution result further cause the apparatus to:
acquire a target key and a target offset value; and
encrypt the domain name resolution result based on the target key and the target offset value, to obtain the encrypted synthetic record domain name.

18. The apparatus according to claim 17, wherein the instructions further cause the apparatus to:
encode the encrypted domain name resolution result in a target encoding scheme to obtain encoded data;
perform target processing on the encoded data to obtain processed target encoded data, wherein the target processing is used for removing target characters from the encoded data; and
obtain the encrypted synthetic record domain name based on an identifier of the target key, the target offset value, and the encrypted domain name resolution result.

19. The apparatus according to claim 16, the instructions further cause the apparatus to:
perform, in a case that the domain name resolution result belongs to IPv6, character segmentation on an encrypted character string in the encrypted domain name resolution result, to obtain the encrypted domain name resolution result.

20. The apparatus according to claim 15, the instructions further cause the apparatus to:
acquire a domain name identifier corresponding to the domain name resolution result; and
add the domain name identifier to the encrypted synthetic record domain name, as a prefix of the encrypted synthetic record domain name.

* * * * *